(12) United States Patent
Nylander et al.

(10) Patent No.: US 11,006,255 B2
(45) Date of Patent: May 11, 2021

(54) INTELLIGENT TRANSPORT SYSTEM TECHNOLOGY CO-EXISTENCE METHOD AND ARRANGEMENT

(71) Applicant: Telefonaktiebolaget LM Ericsson (publ), Stockholm (SE)

(72) Inventors: Tomas Nylander, Värmdö (SE); Lisa Boström, Solna (SE); Stefan Runeson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 16/342,726

(22) PCT Filed: Oct. 21, 2016

(86) PCT No.: PCT/SE2016/051025
§ 371 (c)(1),
(2) Date: Apr. 17, 2019

(87) PCT Pub. No.: WO2018/074957
PCT Pub. Date: Apr. 26, 2018

(65) Prior Publication Data
US 2020/0053527 A1 Feb. 13, 2020

(51) Int. Cl.
*H04W 4/40* (2018.01)
*H04W 4/80* (2018.01)
(Continued)

(52) U.S. Cl.
CPC ............... *H04W 4/40* (2018.02); *H04W 4/80* (2018.02); *H04W 28/0289* (2013.01); *H04W 88/06* (2013.01)

(58) Field of Classification Search
None
See application file for complete search history.

(56) References Cited

U.S. PATENT DOCUMENTS

2016/0295624 A1* 10/2016 Novlan ............... H04W 72/04
2017/0316691 A1* 11/2017 Miller .................. G08G 1/091
(Continued)

FOREIGN PATENT DOCUMENTS

WO WO 2015/019234 A1 2/2015

OTHER PUBLICATIONS

International Search Report and Written Opinion of the International Searching Authority, PCT/SE2016/051025, dated Jul. 11, 2017, 8 pages.
(Continued)

*Primary Examiner* — Jay L Vogel
(74) *Attorney, Agent, or Firm* — Sage Patent Group

(57) ABSTRACT

A method for communication within a cooperative intelligent transport system. The method comprises receiving, in a first node, a first intelligent transport system message from another node of the cooperative intelligent transport system. In the first node, a technology status of that another node is identified. The technology status comprises information whether or not the first intelligent transport system message was transmitted configured according to a predetermined first intelligent transport system technology, and information whether or not the first intelligent transport system message comprises a dual technology indicator. The dual technology indicator is an information element identifying that the node transmitting the first intelligent transport system message is capable of communicating intelligent transport system messages according to the first intelligent transport system technology as well as according to a predetermined second technology. A corresponding node for communication within a cooperative intelligent transport system is also disclosed.

17 Claims, 7 Drawing Sheets

(51) Int. Cl.
*H04W 28/02* (2009.01)
*H04W 88/06* (2009.01)

(56) References Cited

U.S. PATENT DOCUMENTS

2018/0213376 A1\* 7/2018 Pinheiro ............... H04W 76/14
2018/0235022 A1\* 8/2018 Wu .................... H04W 72/087
2019/0037430 A1\* 1/2019 Lee ........................ H04W 4/46

OTHER PUBLICATIONS

Andreas Festag, Cooperative Intelligent Transport Systems Standards in Europe, IEEE Communications Magazine, IEEE Center, Piscataway, US, vol. 52, No. 12, Dec. 1, 2014, XP011567660 pp. 166-172.

\* cited by examiner

ETSI ITS G5          IEEE WAVE

STANDARD ORG

INTELLIGENT TRANSPORT SYSTEM TECHNOLOGY CO-EXISTENCE METHOD AND ARRANGEMENT

CROSS REFERENCE TO RELATED APPLICATIONS

This application is a 35 U.S.C. § 371 national stage application of PCT International Application No. PCT/SE2016/051025 filed on Oct. 21, 2016, the disclosure and content of which is incorporated by reference herein in its entirety.

TECHNICAL FIELD

The proposed technology generally relates to communication in cooperative intelligent transport systems and in particular methods and arrangements for handling multiple intelligent transport system technologies.

BACKGROUND

Cooperative Intelligent Transport Systems (C-ITS) are systems that utilize Information and Communications Technology (ICT) to support improved safety and more efficient usage of the transportation infrastructure for transport of goods and humans over any transportation mean.

ITS services, protocols and connectivity solutions are described in specifications issued by standardization bodies like IEEE, SAE, ETSI and ISO. Besides in the mentioned standards, the C-ITS system architecture is elaborated in research collaborations like COmmunication Network VEhicle Road Global Extension (CONVERGE), Nordic Way and in consortiums of automobile manufacturers, suppliers and research organizations like ERTICO and Car-2-Car Communication Consortium.

There is an ongoing discussion regarding connectivity for C-ITS. The discussion is about whether the ETSI ITS G5/IEEE WAVE DSRC solutions, cellular 3GPP technologies, or a new 3GPP based LTE V2X radio solution should be used, and in what combinations (e.g. hybrid solutions).

A possible scenario is that a future migration from DRSC to LTE-V2X technology will be done. The solution being discussed for this is to partition the spectrum so that one part is used for DSRC, and another part for LTE short range, i.e. LTE V2V and V2I.

However, if each technology gets half of the spectrum, the capacity for each technology will also be halved. Also during a transition period both technologies will exist and vehicles using different technologies needs to be able to communicate.

It is also possible that due to vehicle imports/exports there will be a mix of technologies in a market. Also, in such scenarios vehicles using different technologies needs to be able to communicate.

SUMMARY

It is an object to provide methods and devices enabling a cooperative co-existence of at least two different technologies of encoding ITS messages.

This and other objects are met by embodiments of the proposed technology.

According to a first aspect, there is provided a method for communication within a cooperative intelligent transport system. The method comprises receiving, in a first node of the cooperative intelligent transport system, a first intelligent transport system message from another node of the cooperative intelligent transport system. In the first node, a technology status of that another node is identified. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

According to a second aspect, there is provided a node for communication within a cooperative intelligent transport system. The node is configured to receive a first intelligent transport system message from another node of the cooperative intelligent transport system. The node is configured to identify a technology status of that another node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

According to a third aspect, there is provided a computer program comprising instructions, which when executed by at least one processor, cause the at least one processor to receive a first intelligent transport system message from a node of a cooperative intelligent transport system. The computer program further comprises instructions, which when executed by at least one processor, cause the processor(s) to identify a technology status of the node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

According to a fourth aspect, there is provided a computer-program product comprising a computer-readable medium having stored thereon a computer program according to the third aspect.

According to a fifth aspect, there is provided a carrier comprising the computer program of the third aspect, wherein the carrier is one of an electronic signal, an optical signal, an electromagnetic signal, a magnetic signal, an electric signal, a radio signal, a microwave signal, or a computer-readable storage medium.

According to a fifth aspect, there is provided a node in a cooperative intelligent transport system. The node comprises a transceiver for receiving a first intelligent transport system message from another node of the cooperative intelligent transport system. The node further comprises a technology status manager for identifying a technology status of that another node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

An advantage of the proposed technology is that handling of co-existence of ITS technologies is enabled, e.g. for DSRC and LTE-V2X.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of some basic features of an ITS system and/or analysis of the technical problem.

Cooperative Intelligent Transport Systems (C-ITS) denotes technology and messages applied to transport and infrastructure to transfer information between part systems for improved safety, productivity and environmental performance. This includes stand-alone applications such as traffic management systems, information and warning systems installed in individual vehicles, as well as Cooperative ITS (C-ITS) applications. C-ITS denotes technology applied to communication between application end-points denoted, for example but not limited to, vehicle to infrastructure and vehicle-to-vehicle communications. Vehicle to pedestrian (V2P) and vehicle to Network (V2N) are other examples of application end-points pertaining to a C-ITS. Vehicle to anything (V2X) is used as a summary of all these application end-points.

Figure 2:
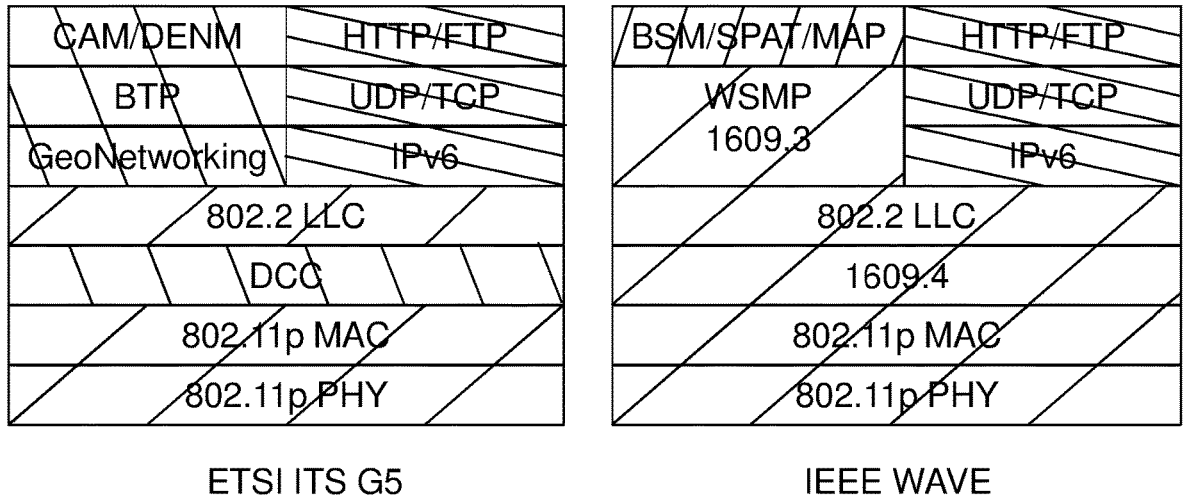
FIG. 2 illustrates DSRC protocol stacks for European and US standards.
Figure 2:
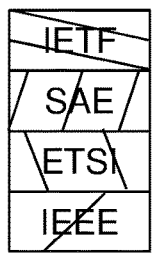

FIG. 2 depicts schematically a C-ITS system 1. The C-ITS system 1 comprises communication nodes 10, communicating with the core C-ITS system 1 by internal network communication 11, which can be wired and/or wireless. Infrastructure items 2 are provided with Road Side Units (RSU) 20, and communicate with the C-ITS system 1 by a backhaul network 12. This backhaul network can be wired and/or wireless. Non-exclusive examples of common infrastructure items 2 are traffic lights and road signs. Vehicles 4 communicate with different entities in the C-ITS system 1 using an On Board Unit (OBU) 40. OBUs 40 can also be carried by pedestrians 3.

Thus, the communication equipment in these entities is either the RSU 20 or the OBU 40. The OBU 40 can communicate while moving and are either mounted in vehicles 4 or carried by pedestrians 3. For the pedestrian, the OBU 40 is typically included in a smartphone.

The vehicle communication within the C-ITS system is generally denoted as Vehicle to anything (V2X) 50. The particular types of communication are denoted according to Table 1.

TABLE 1

Figure 1:
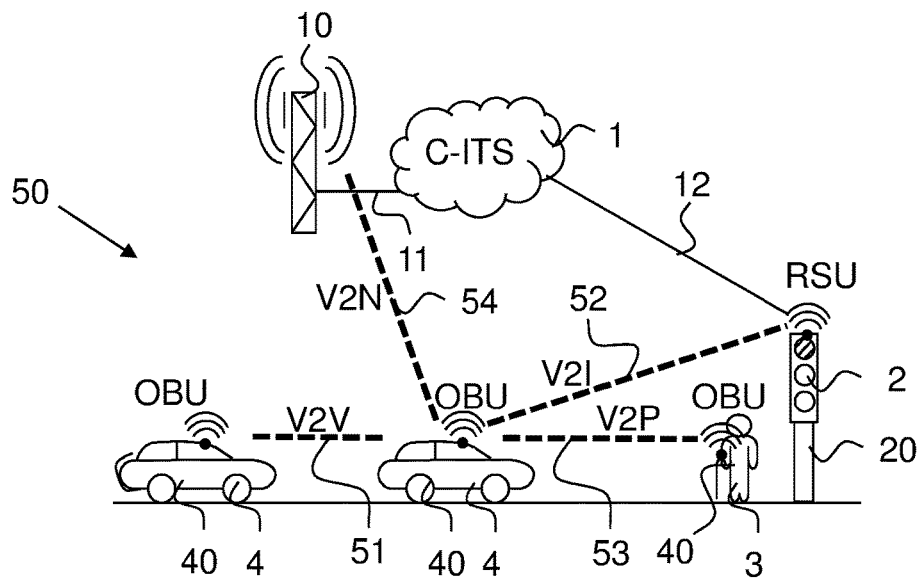
FIG. 1 is a schematic drawing of communication within a C-ITS system.

| Vehicle communication to different entities | | |
|---|---|---|
| Abbreviation | Reference in FIG. 1 | Explanation |
| V2V | 51 | Vehicle-to-vehicle |
| V2I | 52 | Vehicle-to-infrastructure |
| V2P | 53 | Vehicle-to-pedestrian |
| V2N | 54 | Vehicle-to-network |

V2X 50 is thus used as a collection name for this type of vehicle communication. V2X extends the safety sensors in a vehicle, e.g. on-board radars and cameras, beyond the limitation of Line-of-Sight (LoS).

Road Side Unit (RSU)

Road Side Units (RSUs) 20 are communication equipment located at the roadside. They are often but not always connected to infrastructure items 2 such as roadside equipment like traffic lights or variable road signs. RSUs 20 are either stationary or sometimes nomadic, e.g. roadwork signs. RSUs 20 are connected to a backhaul network 12. In other words, a RSU is a stationary or nomadic communication equipment arranged for short range communication and connected to a backhaul network of a C-ITS.

RSUs 20 have two primary functions. A first one is to send V2I messages with information from the connected roadside equipment to OBUs 40. This may e.g. be warning messages (DENM) or Signal Phase and Timing (SPAT) messages for connected traffic lights, see further below. The second primary function is to forward multi-hop V2V and/or V2I messages to OBUs 40 and other RSUs 20 to extend coverage area for V2V and/or V2I messages. RSUs 20 that are connected to roadside equipment both send V2I messages and forward multi-hop V2V and/or V2I messages. Other RSUs 20 only forward multi-hop V2V and/or V2I messages to extend coverage area for V2V and/or V2I.

On Board Unit (OBU)

On board Units (OBUs) 40 are normally located in vehicles 4, and normally integrated to the vehicle system and dashboard. They are equipped with a radio, e.g. DSRC for short range communication. In the future, LTE technology might be used for the short range communication. The fact that the OBU 40 is integrated means that it for example can receive events from the vehicle system, display that on a dashboard, or forward information to other vehicles 4 or RSUs 40 using the short range communication or to forward the information to road traffic authorities using a network connection 54. The OBU 40 can of course also receive information on the short range radio or from the network and display or forward that information. In other words, an OBU is a mobile communication equipment arranged for short range communication within a C-ITS.

As a non-limiting illustrative example, a wheel that loses the grip relative to the road surface can be detected by the vehicle system and a slippery road warning can be distributed with a broadcast message on the short range radio or sent to a central entity for evaluation.

V2X short range communication may be based upon different technologies, e.g. DSRC or LTE V2X.

Dedicated Short Range Communication (DSRC)

In this document, the term DSRC is used to denote connections based on 802.11p technology. There are presently two Dedicated Short Range Communication (DSRC) standards. ETSI ITS G5 is used in Europe and IEEE Wireless Access in Vehicular Environments (WAVE) is used in the US. FIG. 2 illustrates the similarities and the differences.

Cooperative Awareness Messages (CAM) comprises messages exchanged in the ITS network between ITS stations to create and maintain awareness of each other and to support cooperative performance of vehicles using the road network. A Decentralized Environmental Notification Message (DENM) is a facilities layer message that is mainly used by the ITS applications in order to alert road users of a detected event using the ITS communication technologies. A Basic Safety Message (BSM) typically comprises vehicle position, speed, acceleration vehicle size and brake system status. A Signal Phase And Timing (SPAT) message comprises identification and characterization of signalized intersections. The MapData Message (MAP) is used as wrapper object to relate all the types of maps defined in the standard. The Basic Transport Protocol (BTP) serves for an end-to-end, connection-less transport service in the ITS ad hoc network. Its main purpose is the multiplexing of messages from different processes at the ITS Facilities layer, e.g. CAM and DENM services, for the transmission of packets via the GeoNetworking protocol as well as the de-multiplexing at the destination). Decentralized Congestion Control (DCC) is a component of ITS stations to maintain network stability, throughput efficiency and fair resource allocation to ITS stations. The Medium Access Control (MAC) is responsible for addressing and channel access control mechanisms that make it possible for several terminals or network nodes to communicate within a multiple access network that incorporates a shared medium. The Physical layer (PHY) is responsible for the electrical and physical specifications of the data connection. WAVE Short Message Protocol (WSMP) is responsible for optimizing the transmission on the radio channels.

The different standardization bodies are indicated by the hatching of the boxes in FIG. 2.

Both versions use the same Physical (PHY) layer and Media Access Control (MAC) layer. These layers are according to IEEE 802.11p, an amendment to the IEEE 802.11 standard for wireless access in vehicular environments. The third layer in IEEE WAVE is according to IEEE 1609.4, while the ETSI ITS G5 provides DCC. Both version use Logical link control (LLC) based on IEEE 802.2.

Messages are broadcasted.

In ETSI ITS G5, Decentralized Environmental Notification Messages (DENM) are event based and can be repeated for example as long as the event prevails.

Cooperative Awareness Messages (CAM) are sent semi-periodically, i.e. with a periodicity between 100 ms to is if criteria to send are fulfilled. This can e.g. be that the vehicle has moved a certain distance, or that the direction has changed, etc.

Higher layer protocols are different in ITS G5 and WAVE, and different functions are sometimes solved on different layers, see Table 2.

TABLE 2

Functions implemented on different layers in ITS G5 and WAVE

| Function | ETSI ITS G5 | IEEE WAVE |
| --- | --- | --- |
| Congestion control | Data link layer Decentralized Congestion Control (DCC) | Application layer Basic Safety Message (BSM) |
| Geo networking | Network layer GeoNetworking protocol | Application layer Similar function as ETSI ITS G5 |
| Retransmission | Application layer Periodic transmission | Application layer Periodic transmission |
| Security | Application layer Signed message and PKI certificate transmitted in every message | Application layer Signed message and PKI certificate transmitted in every message |

Although IP based communication is standardized in both ITS G5 and WAVE, it is not commonly used in practice.

LTE V2X

3GPP has recently started standardization activities for V2X services. The major benefits of LTE based V2X services are the possibility to reuse installed LTE infrastructure as well as installed LTE connectivity in vehicles.

The application messages for LTE V2X services used for V2V and V2I are the same or similar as for DSRC, i.e. broadcast of CAM, DENM and possibly Signal Phase and Timing/MapData Messages (SPaT/MAP), but using LTE technology for the short range communication instead of DSRC. The LTE technology is using the so called 'sidelink' (also known as PC5) for its short range communication.

3GPP are expected to continue the evolution and improvement of LTE V2X by adding enhancements in upcoming releases, e.g. in the LTE/5G.

That LTE technology should be used for the short range communication is the aim for the ongoing 3GPP standardization.

At present time it is unclear which technology will be the globally selected one to use for direct communication among vehicles, infrastructure and pedestrians. It is even quite likely that there will be no global standard, and that different technologies will be used in different parts of the world. It should also be noted that with DSRC-based technology, the US (IEEE WAVE) and European (ITS-G5) protocol flavors differ slightly.

In the US there are legislative proposals for mandating DSRC in new vehicles manufactured from 2019. Also, considering there have already been several V2X trials using DSRC-based technology, as well as that there are existing commercial products available, it may even be so that DSRC technology would be deployed initially and then eventually swapped to LTE and/or 5G later on. In such case there would be an interim time when both technologies would need to co-exist. Considering the support in vehicles this interim time could be quite long as people are not expected to buy a new vehicle just to get support for the new technology. Even swapping the communication unit in the existing vehicle could be costly and difficult to achieve high penetration for unless mandated by law somehow.

In order to allow for an efficient co-existence of at least two different ITS technologies, adaptations or modifications have to be employed.

In the foreseeable scenario presented above, a successive transition between an "old" technology, DSRC, and a "new" technology LTE V2V/V2I (PC5) may be a typical model system. However, the general ideas of a successive changing to a preferred second technology of encoding ITS messages starting from a non-preferred first technology of encoding ITS messages are not limited to the DSRC and LTE V2V/V2I (PC5), but may be applied also to other technology switches.

According to the presented technology, a vehicle comprises an OBU that is capable of encoding, sending, receiving and decoding, i.e. handling or using, ITS messages according to a first technology. Furthermore, the OBU is additionally capable of encoding, sending, receiving and decoding, i.e. handling or using, ITS messages also according to a second technology. In a particular example below, the second technology is the LTE V2X and the first technology is the DSRC. In another particular example below, the first technology is the LTE V2X and the second technology is the DSRC.

Furthermore, the vehicle having an OBU capable of using both the first and the second technology should include an information element about this in transmitted messages. Such information element, here denoted a dual technology information element, is preferably included on a layer above the transport layer, e.g. on the application layer. This inclusion is to indicate its capabilities to aid other vehicles that it does not need to send according to the second technology.

A vehicle capable of the second technology should also decode received messages according to the first technology standard in order to determine if the first technology is used by some vehicles. If messages according to the first technology is heard, and if there is no dual technology information element received, it has to be assumed that the transmitting unit does not have access to the second technology. The vehicle OBU therefore needs to send its messages, not only according to the preferred second technology, but also according to the first technology. Alternatively, the vehicle OBU sends its messages only according to the first technology.

Figure 3:
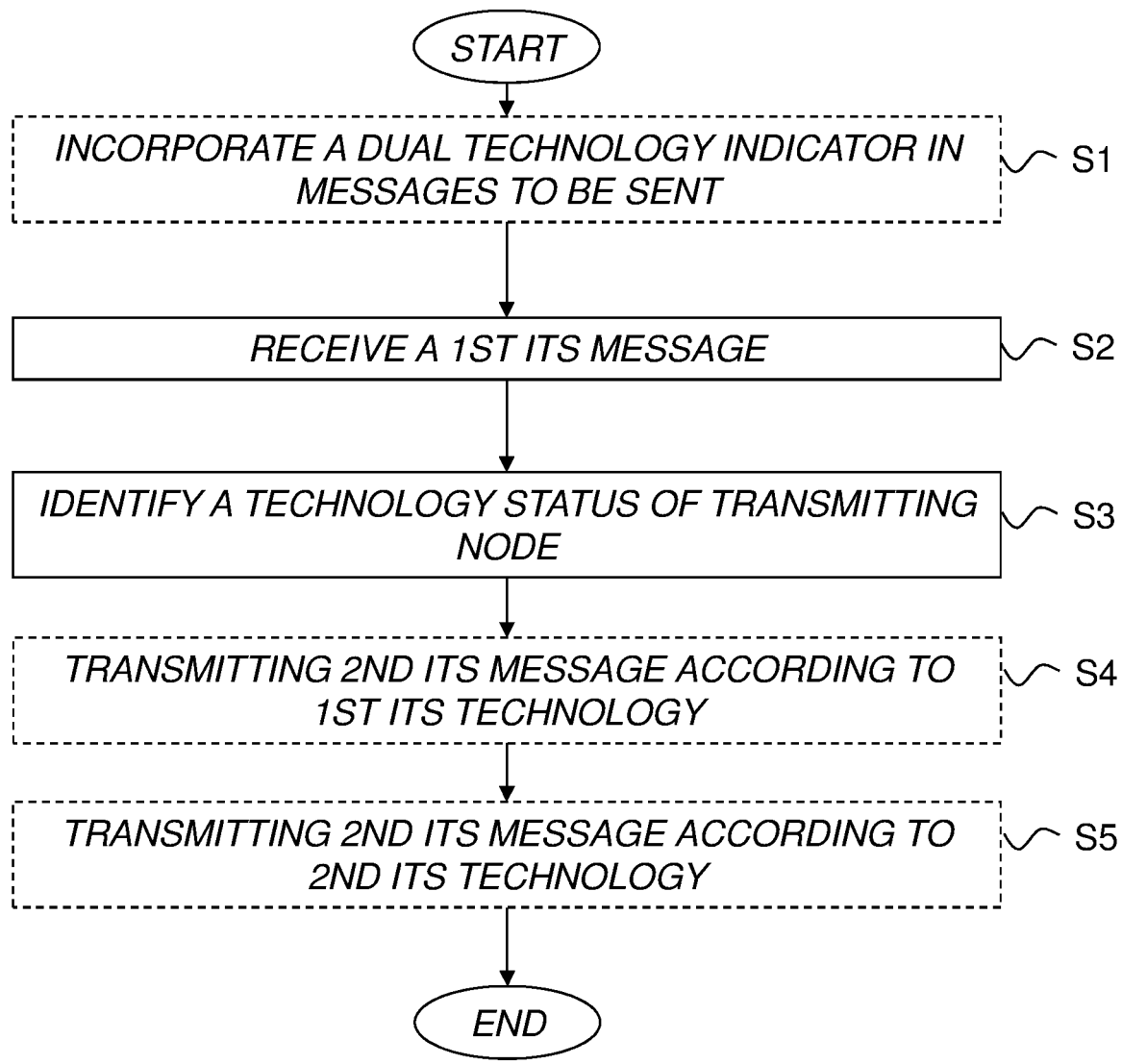
FIG. 3 is an illustration of steps of an embodiment of a method for communication within a cooperative intelligent transport system.

FIG. 3 is a schematic flow diagram illustrating steps of an embodiment of a method for communication within a cooperative intelligent transport system. The method comprises, in step S2, receiving of a first intelligent transport system message. The receiving is performed in a first node of the cooperative intelligent transport system and the first intelligent transport system message is transmitted from another node of the cooperative intelligent transport system. The transmission is typically a broadcasting transmission. However, also other types of transmissions are applicable, such as multicast or unicast.

In step S3, a technology status of that another node, i.e. the node transmitting the first intelligent transport system message, is identified. This identification is also performed in the first node, or is at least demanded by the first node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

By these two steps, the first node is provided with information that enables the first node to adapt its transmitting behaviour within the C-ITS. The technology status is preferably coordinated with other types of information that the first node has regarding the node sending the first ITS message. The technology status information can then at any following occasion be used for deciding about how e.g. transmissions are to be planned.

In one embodiment, the first node has decided to transmit a second ITS message. This is typically broadcasted and if the node that transmitted the first ITS message is within a coverage area for such a broadcasting, the second ITS message is available for this other node. However, the embodiment is also applicable to multicasting or unicast transmissions. To this end, as illustrated by step S4, a second intelligent transport system message is transmitted from the first node. As discussed above, the second intelligent transport system message is available for at least the other node. If the technology status of that other node shows that the first intelligent transport system message was transmitted configured according to the predetermined first intelligent transport system technology as well as that the first intelligent transport system message did not comprise any dual technology indicator, the first node adapts its transmission routines. In order to incorporate the other node among the nodes that might receive and decode the second ITS message, the second intelligent transport system message is transmitted configured according to the first intelligent transport system technology.

In certain scenarios, the second ITS technology could be the dominating technology. This could be the case due to e.g. political, economic or technical reasons. In certain cases, it would be beneficial to have a redundant transmission also according to the second ITS technology, in particular if the load in the radio resources is low. Therefore, in a further embodiment, as illustrated by step S5, the transmitting of the second intelligent transport system message also comprises transmitting the second intelligent transport system message configured according to the second intelligent transport system technology.

The above ideas operate best if all nodes within the ITS contribute to the above described information spreading. Even if the principles are functional also for situations where some nodes keep their technology status for themselves, it is preferred if all nodes both makes the technology status information available as well as using the technology status information of other nodes for adapting the own transmission. To this end, in one embodiment, and as illustrated by step S1, the method preferably further comprises incorporating of a dual technology indicator in a layer above the transport layer in messages to be transmitted from the first node configured according the first intelligent transport system technology. This incorporation is performed or at least demanded by the first node. In other words, the nodes having a dual technology capacity should preferably both announce this property to its neighbour nodes and use it to facilitate communication with nodes not having such capacities.

In a particular example, it is assumed that there has been a switch from DSRC to LTE-V2V/V2I (PC5) in e.g. a country. It is further assumed that new vehicles support both DSRC and LTE-V2V/V2I (PC5). In the basic concept, the vehicles that support both DSRC and LTE-V2V/V2I have been instructed or configured to start using LTE-V2V/V2I when sending ITS messages. However, these vehicles also listen for and decode messages according to DSRC. If the vehicles detect DSRC encoded messages, they will send its ITS messages either only on DSRC or on both technologies, as long as it hears DSRC messages.

Since it is desirable to limit the sending of messages on both technologies to optimize spectrum usage, a further improvement is provided by the introduction of the new information element. This information element is provided on the application layer, or above the transport layers related to the respective technology, in order to readily be detectable by any receiving party. This new information element indicates the capabilities of the vehicle, in this case that it supports both LTE V2V/V2I (PC5) and DSRC.

Then vehicles also look for this new information element before deciding to send on DSRC. This would further distinguish old vehicles from new vehicles that send DSRC but also support LTE technology, but have not got their switch to LTE yet. E.g. if DSRC is heard from vehicles that support LTE technology there is no reason to also send on DSRC.

The transmission of intelligent transport system messages configured according to the first intelligent transport system technology should continue as long as there are nodes within listening distance that is not capable of using the second intelligent transport system technology. However, if all such nodes disappear from the area in which the transmissions are detectable, continuing transmissions according to the first intelligent transport system technology are only a waste of energy and radio resources. It is in such a situation preferably to switch back to transmissions only according to the second intelligent transport system technology.

Vehicles or infrastructure, having OBUs and/or RSUs, do typically transmit different ITS messages with a certain regularity. If messages from a certain source cease to appear for a certain node, it could be used as an indicator that the sending sources is turned off or has left the coverage area of the present node. If all transmissions according to the first intelligent transport system technology, where the sending node lacks the dual technology ability, vanish, no nodes in the neighbourhood need any further transmissions according to the first ITS technology. In order to avoid turning on and off this adaptation of transmissions, a time margin could preferably be used.

In other words, in one embodiment, the method further comprises refraining from transmitting intelligent transport system messages configured according to the first intelligent transport system technology if a time since a last intelligent transport system message transmitted, using the first intelligent transport system technology, from any other node not comprising any dual technology indicator in its intelligent transport system message exceeds an invalidation time. The invalidation time is larger, preferably at least one order of magnitude larger, than an expected longest time between intelligent transport system messages from the mentioned any other node not comprising any dual technology indicator in its intelligent transport system message.

In embodiments according to the example further above, the first intelligent transport system technology was a Dedicated Short-Range Communication technology. Also in the example further above, the second intelligent transport system technology was a LTE V2X short range communication technology.

In other embodiment, the first intelligent transport system technology may be a LTE V2X short range communication technology. The second intelligent transport system technology may then be a Dedicated Short-Range Communication technology.

Also other combinations of technologies are possible. In some embodiment, the DSRC or the LTE V2X could be combined with any other intelligent transport system technology, for example but not limited to, evolved LTE (LTE-e) V2X or 5G The above presented method is advantageously implemented in nodes of a vehicle or a pedestrian. In other words, any of the above discussed nodes may be an on board unit.

However, since RSUs are likely to communicate with many different OBUs, it is also advantageous to implement the method in a road side unit.

The proposed technology may be applied to a terminal, which may be a wired or wireless device.

As used herein, the non-limiting terms "User Equipment (UE)", "station (STA)", RSU, OBU and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "node" or "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a node for communication within a cooperative intelligent transport system configured to receive a first intelligent transport system message from another node of the cooperative intelligent transport system. The node is further configured to identify a technology status of that another node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

In one embodiment, the node is further configured to transmit a second intelligent transport system message. The second intelligent transport system message is available at least for the mentioned other node. If the technology status of that other node shows that the first intelligent transport system message was transmitted configured according to a predetermined first intelligent transport system technology as well as that the first intelligent transport system message did not comprise any dual technology indicator, this transmitting comprises transmitting the second intelligent transport system message configured according to the first intelligent transport system technology.

In a further embodiment, the node is further configured to further transmit the second intelligent transport system message configured according to the second intelligent transport system technology.

In one embodiment, the node is further configured to incorporate a dual technology indicator in a layer above the transport layer in messages to be transmitted from the first node configured according the first intelligent transport system technology.

In one embodiment, the node is further configured to refraining from transmitting intelligent transport system messages configured according to the first intelligent transport system technology if a time since a last intelligent transport system message transmitted, using the first intelligent transport system technology, from any other node not comprising any dual technology indicator in its intelligent transport system message exceeds an invalidation time. The invalidation time is at least one order of magnitude larger than an expected longest time between intelligent transport system messages from the any other node not comprising any dual technology indicator in its intelligent transport system message.

In one embodiment, the first intelligent transport system technology is a Dedicated Short-Range Communication technology. In a further embodiment, the second intelligent transport system technology is a Long-Term Evolution Vehicle to Anything short range communication technology.

In one embodiment, the first intelligent transport system technology is a Long-Term Evolution Vehicle to Anything short range communication technology. In a further embodiment, the second intelligent transport system technology is a Dedicated Short-Range Communication technology.

Figure 4:
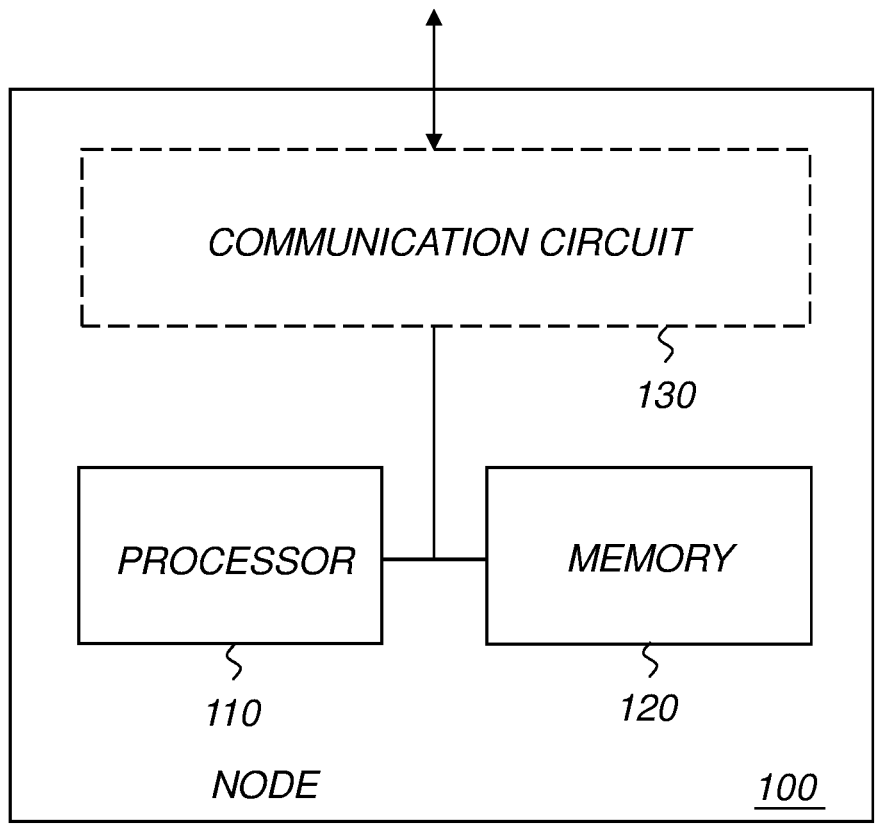
FIG. 4 is a schematic drawing of parts of an embodiment of a node for communication within a cooperative intelligent transport system.

FIG. 4 is a schematic block diagram illustrating an example of a node 100 for communication within a cooperative intelligent transport system, based on a processor-memory implementation according to an embodiment. In this particular example, the node 100 comprises a processor 110 and a memory 120, the memory 120 comprising instructions executable by the processor 110, whereby the processor is operative to identify the technology status of the above mentioned other node.

Optionally, the node 100 may also include communication circuitry 130. The communication circuitry 130 may include functions for wired and/or wireless communication with other devices and/or network nodes in the network. In a particular example, the communication circuitry 130 may be based on radio circuitry for communication with one or more other nodes, including transmitting and/or receiving information. The communication circuitry 130 may be interconnected to the processor 110 and/or memory 120. By way of example, the communication circuitry 130 may include any of the following: a receiver, a transmitter, a transceiver, input/output (I/O) circuitry, input port(s) and/or output port(s). In other words, in one embodiment, the node comprises communication circuitry configured to receive the first intelligent transport system message from the mentioned other node of the cooperative intelligent transport system.

Figure 5:
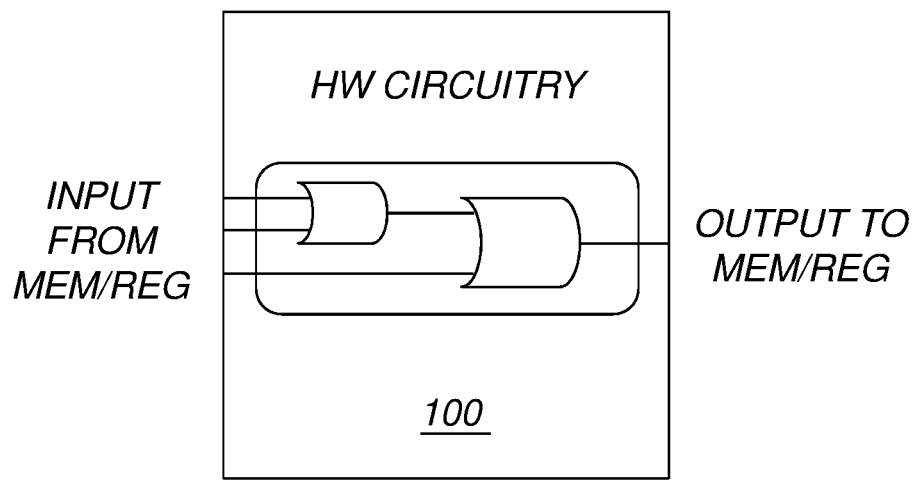
FIG. 5 is a schematic drawing of parts of another embodiment of a node for communication within a cooperative intelligent transport system.

FIG. 5 is a schematic block diagram illustrating another example of a node 100 for communication within a cooperative intelligent transport system, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 6:
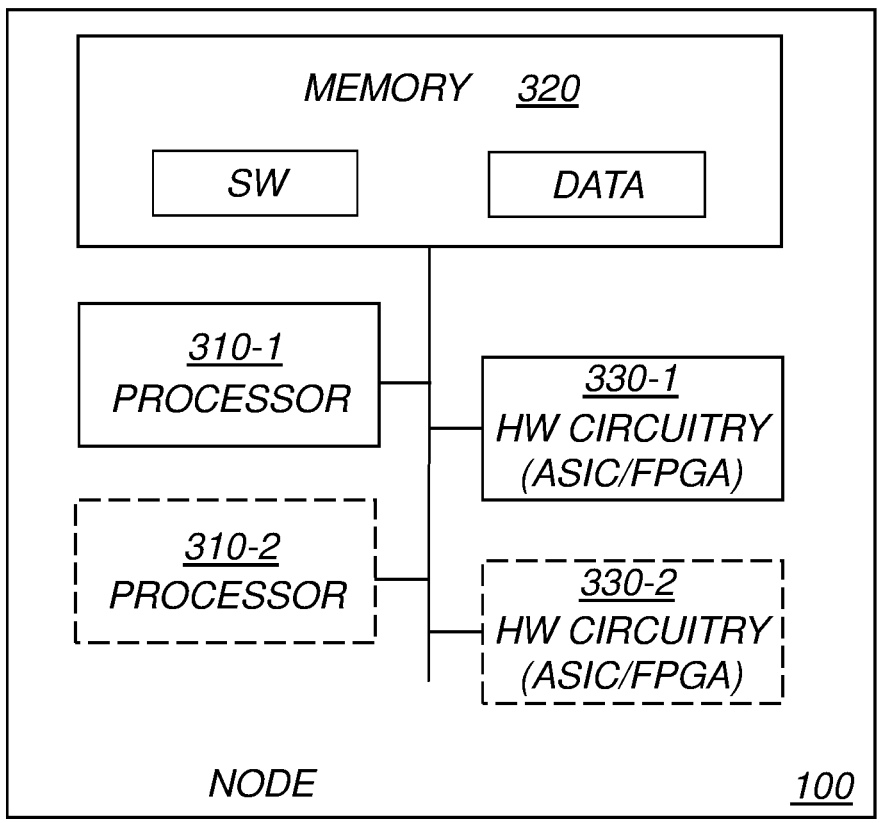
FIG. 6 is a schematic drawing of parts of yet another embodiment of a node for communication within a cooperative intelligent transport system.

FIG. 6 is a schematic block diagram illustrating yet another example of a node 100 for communication within a cooperative intelligent transport system, based on combination of both processor(s) 310-1, 310-2 and hardware circuitry 330-1, 330-2 in connection with suitable memory unit(s) 320. The node 100 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 7:
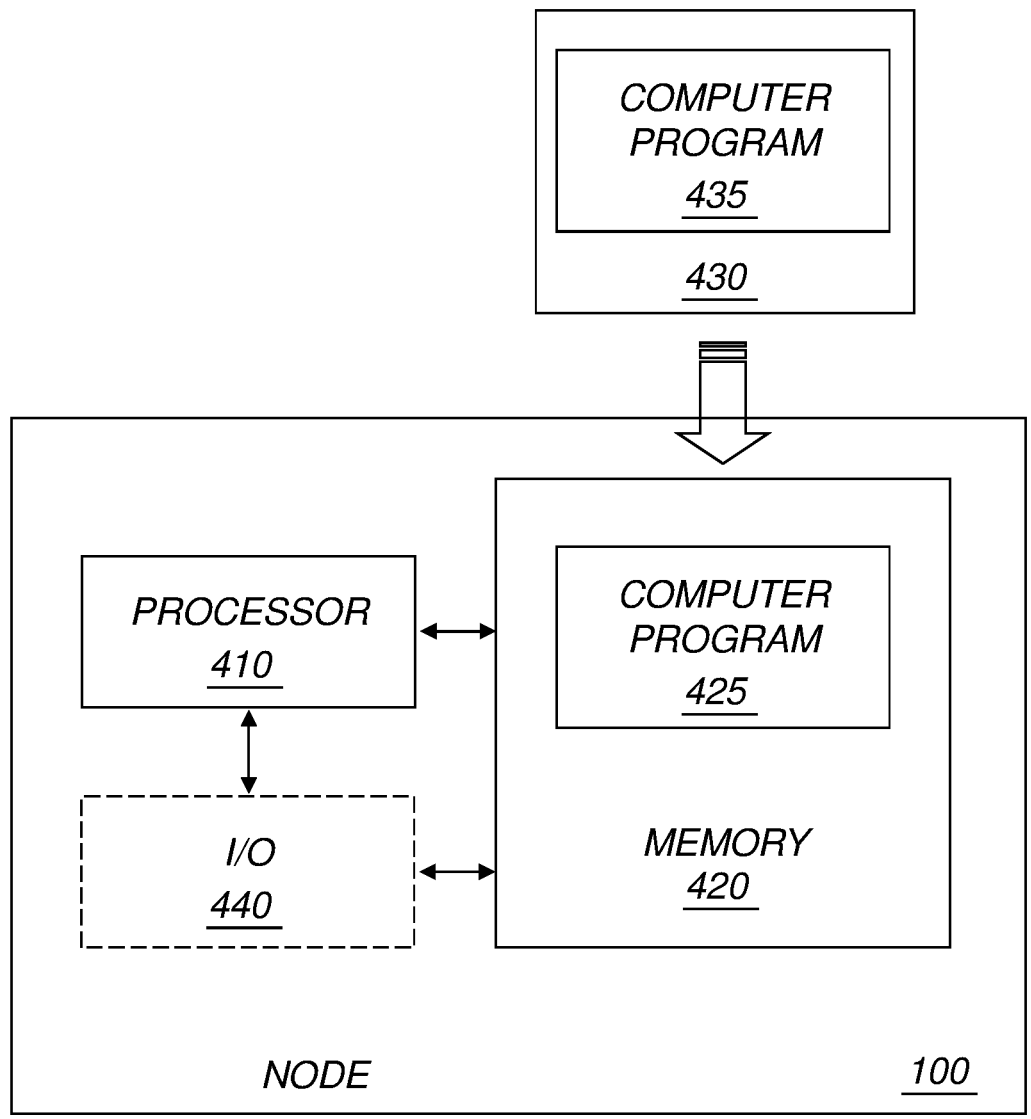
FIG. 7 is a schematic drawing of parts of an embodiment of a node for communication within a cooperative intelligent transport system implemented by software.

FIG. 7 is a schematic diagram illustrating an example of a computer-implementation of a node 100 for communication within a cooperative intelligent transport system according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to receive a first intelligent transport system message from a node of a cooperative intelligent transport system, and to identify a technology status of that node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The proposed technology also provides a computer-program product comprising a computer-readable medium having stored thereon a computer program as described above. By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 8:
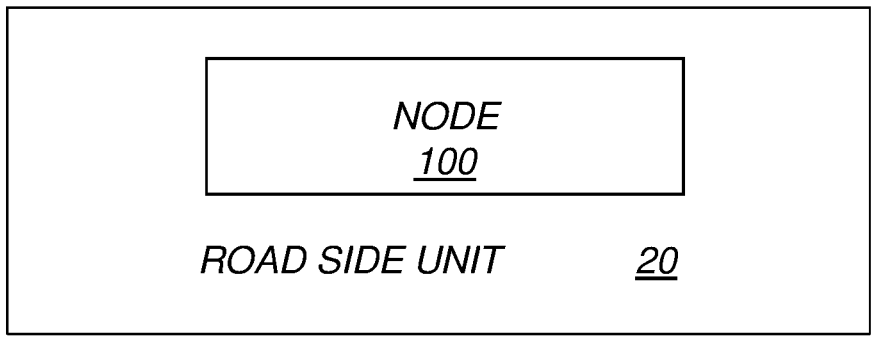
FIG. 8 is a schematic drawing of an embodiment of a road side unit comprising a node for communication within a cooperative intelligent transport system.

FIG. 8 is a schematic block diagram illustrating an example of a road side unit 20 comprising a node 100 according to any of the embodiments. With reference to the different embodiments mentioned above, either of, or both, of the node receiving the first ITS message and the node transmitting the first ITS message may be a road side unit.

Figure 9:
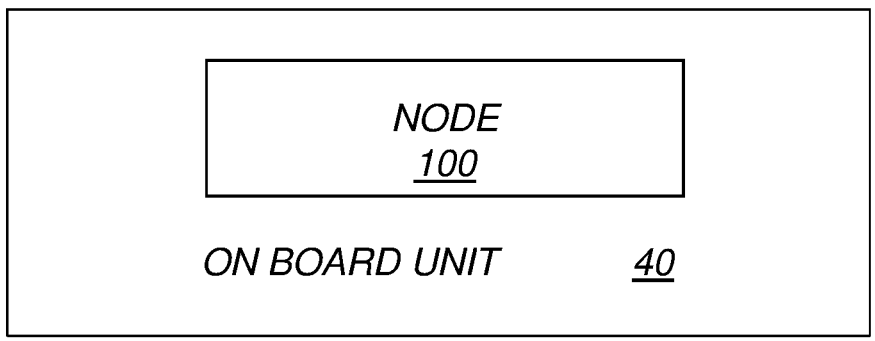
FIG. 9 is a schematic drawing of an embodiment of an on board unit comprising a node for communication within a cooperative intelligent transport system.

FIG. 9 is a schematic block diagram illustrating an example of an on board unit 40 comprising a node 100 according to any of the embodiments. With reference to the different embodiments mentioned above, either of, or both, of the node receiving the first ITS message and the node transmitting the first ITS message may be an on board unit.

The road side unit 20 and the on board unit 40 are examples of a network device comprising a node 100 for communication within a cooperative intelligent transport system as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit in a wireless communication system, wherein the communication unit comprises a node 100 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 10:
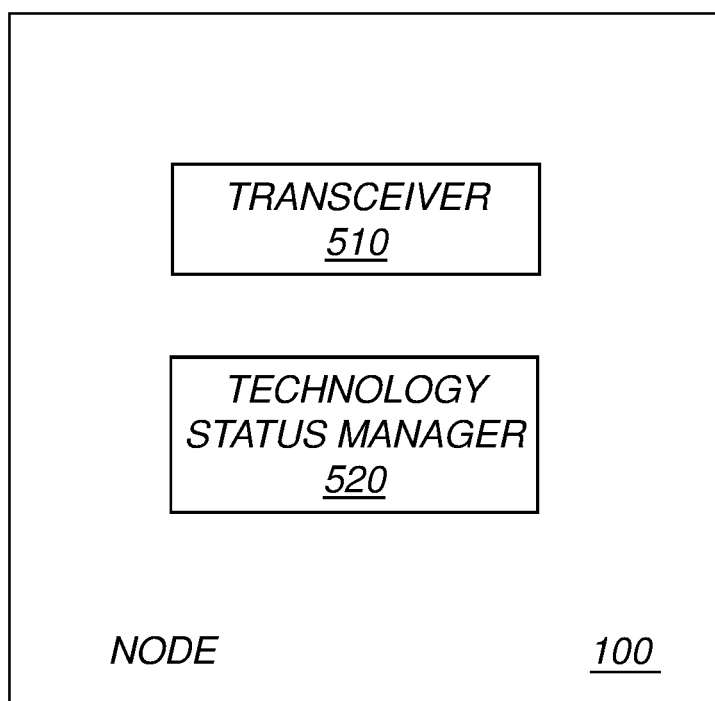
FIG. 10 is a schematic drawing of modules of an embodiment of a node for communication within a cooperative intelligent transport system.

FIG. 10 is a schematic diagram illustrating an embodiment of a node 100 in a cooperative intelligent transport system. The node 100 comprises a transceiver 510 for receiving a first intelligent transport system message from another node of the cooperative intelligent transport system. The node 100 also comprises a technology status manager 520 for identifying a technology status of that other node. The technology status comprises information whether or not the first intelligent transport system message was transmitted configured according to a predetermined first intelligent transport system technology. The technology status further comprises information whether or not the first intelligent transport system message comprises a dual technology indicator in a layer above the transport layer. The dual technology indicator is an information element identifying that the node transmitting the first intelligent transport system message is capable of communicating intelligent transport system messages according to the first intelligent transport system technology as well as according to a predetermined second intelligent transport system technology.

Alternatively it is possible to realize the module(s) in FIG. 10 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The simultaneous use of different ITS technologies may be implemented in different ways. If the spectrum used for ITS messages is partitioned between different ITS technologies, e.g. in a particular example for DSRC and LTE-V2V/V2I, respectively, each technology needs to handle congestion situations individually according to standards. The spectrum may be divided e.g. in two halves, or in any other partition ratio, static or dynamic.

However, if both ITS technologies can make use of the whole spectrum, additional measures are needed to be spectrum efficient and to reduce the risk of congestion situations. Since sending messages using both technologies use more spectrum, different actions can be taken depending on detected level of congestion. There might be market requirements, e.g. the wish to maintain messages for one particular ITS technology, e.g. LTE technology, as long as possible, or ensure that vehicles with only one particular ITS technology, e.g. DSRC technology, can communicate.

Figure 11:
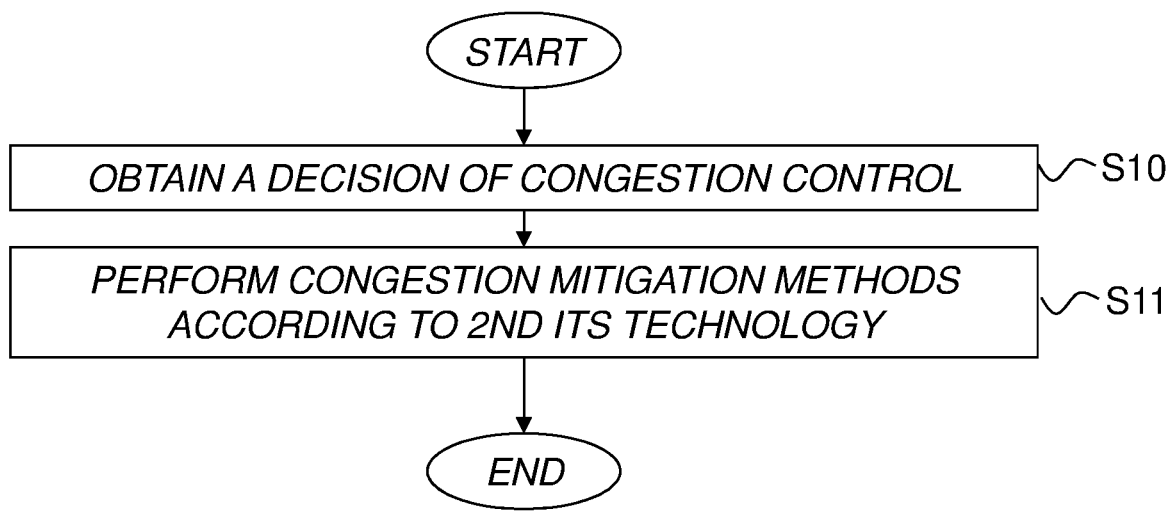
FIG. 11 is an illustration of steps of an embodiment of a method for communication within a cooperative intelligent transport system.

In one embodiment, as illustrated in FIG. 11, the method for communication within a cooperative intelligent transport system further comprises in step S10 obtaining of a decision of congestion mitigation. The method also in step S11 comprises performing of congestion mitigation methods according to the second intelligent transport system technology, if said technology status of said another node shows that said first intelligent transport system message was transmitted configured according to said predetermined first intelligent transport system technology as well as that said first intelligent transport system message did not comprise any dual technology indicator, while maintaining transmissions configured according to the first intelligent transport system technology unaltered. In a further embodiment, the congestion mitigation methods according to the second intelligent transport system technology comprises ceasing of transmissions configured according to the second intelligent transport system technology.

Figure 12:
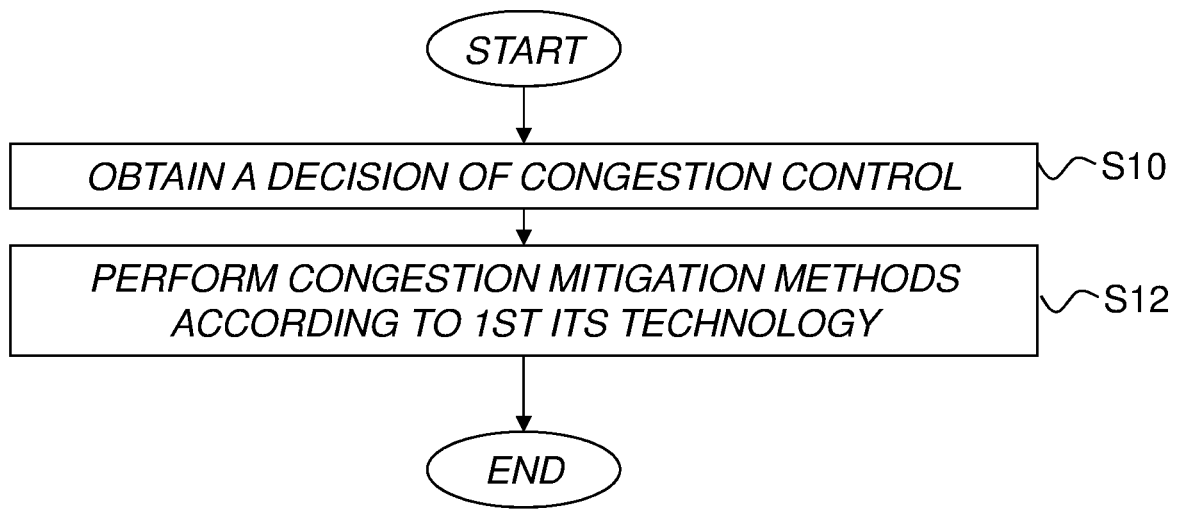
FIG. 12 is an illustration of steps of another embodiment of a method for communication within a cooperative intelligent transport system.

In another embodiment, as illustrated in FIG. 12, the method for communication within a cooperative intelligent transport system further comprises in step S10 obtaining of a decision of congestion mitigation. The method also in step S12 comprises performing of congestion mitigation methods according to the first intelligent transport system technology, if said technology status of said another node shows that said first intelligent transport system message was transmitted configured according to said predetermined first intelligent transport system technology as well as that said first intelligent transport system message did not comprise any dual technology indicator, while maintaining transmissions configured according to the second intelligent transport system technology unaltered. In a further embodiment, the congestion mitigation methods according to the first intelligent transport system technology comprises ceasing of transmissions configured according to the first intelligent transport system technology.

In an apparatus aspect, in one embodiment, the node for communication within a cooperative intelligent transport system is further configured to obtain a decision of congestion mitigation. The node is further configured to perform congestion mitigation methods according to the second intelligent transport system technology, if said technology status of said another node shows that said first intelligent transport system message was transmitted configured according to said predetermined first intelligent transport system technology as well as that said first intelligent transport system message did not comprise any dual technology indicator, while maintaining transmissions configured according to the first intelligent transport system technology unaltered. In a further embodiment, the congestion mitigation methods according to the second intelligent transport system technology comprises ceasing of transmissions configured according to the second intelligent transport system technology.

In an apparatus aspect, in another embodiment, the node for communication within a cooperative intelligent transport system is further configured to obtain a decision of congestion mitigation. The node is further configured to perform congestion mitigation methods according to the first intelligent transport system technology, if said technology status of said another node shows that said first intelligent transport system message was transmitted configured according to said predetermined first intelligent transport system technology as well as that said first intelligent transport system message did not comprise any dual technology indicator, while maintaining transmissions configured according to the second intelligent transport system technology unaltered. In a further embodiment, the congestion mitigation methods according to the first intelligent transport system technology comprises ceasing of transmissions configured according to the first intelligent transport system technology.

The need for congestion control can be detected in different ways. A network node may detect a high radio resource utilization or is informed about the utilization by any other network node. Such network node may be a RSU or an OBU or a more central node in the core ITS system. A decision for congestion mitigation may be taken. If this decision is to be effectuated in the same node as the decision is taken, the obtaining of a decision of congestion mitigation comprises the actual making of the decision of congestion mitigation. If the congestion mitigation is to be performed by another node, a message or congestion mitigation demand can be communicated to the node intended to perform the actual congestion mitigation. In such a case, the obtaining of a decision of congestion mitigation comprises receiving a decision of congestion mitigation from another node.

A few examples will illuminate different aspects. If LTE technology is preferred over DSRC, e.g. if it supports more use cases, it is assumed to be more spectrum efficient etc. The following approaches could then be taken depending on the level of congestion.

A first variant is, if any of the technologies detect congestion at a certain level, that both technologies initiates congestion mitigation methods as per standards in a decentralized fashion, e.g. reduce the frequency of sending messages or refrain from sending certain types of messages related to certain priorities or events. This variant does not involve any changes in the normal standards of the different technologies when applied separately.

A second variant is, if any of the technologies detect congestion at a certain level, that congestion mitigation methods are initiated on DSRC as per standards in a decentralized fashion. This can be performed e.g. by reducing the frequency of sending messages or refraining from sending certain types of messages related to certain priorities or events. If congestion still exists, transmission on DSRC could cease completely.

Alternatively, if DSRC technology should be maintained, i.e. be allow having a long transition time to LTE technology and that vehicles that only support DSRC are allowed to communicate, another solution would provide backwards compatibility and a better spectrum utilization. The new information element to indicate vehicles capabilities as described here above is used to determine if there are vehicles that only support DSRC in an area. Then in high load situations, i.e. congestion situations, if any vehicle is sending using DSRC without including the new information element, the vehicles need to fallback to only using only DSRC, i.e. the transmission on LTE V2V/V2I technology is stopped which result in an increased air capacity and still maintain communication with old DSRC only vehicles.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

ASIC Application Specific Integrated Circuits
BTS Base Transceiver Stations
CAM Cooperative Awareness Message
CD Compact Disc
C-ITS Cooperative ITS
CPE Customer Premises Equipment
CPU Central Processing Units
DENM Decentralized Environment Notification Message
DSP Digital Signal Processors
DSRC Dedicated Short-range communication.
DVD Digital Versatile Disc
eNB evolved Node B
ETSI European Telecommunications Standards Institute
FPGA Field Programmable Gate Arrays
HDD Hard Disk Drive
HW hardware
ICT Information and Communications Technology
IEEE Institute of Electrical and Electronics Engineers
IETF Internet Engineering Task Force
I/O input/output
ITS Intelligent Transport System
LEE Laptop Embedded Equipment
LLC Logical link control
LME Laptop Mounted Equipment
MEM memory units
MNO Mobile Network Operator
OEM Original Equipment Maker (e.g. the car manufacturer)
PC Personal Computer
PC5 3GPP sidelink interface used for direct device to device (D2D) communication
PDA Personal Digital Assistant
PLC Programmable Logic Controllers
RAM Random Access Memory
REG registers
ROM Read-Only Memory
RRU Remote Radio Units
RSU Road Side Unit
RTA Road Traffic Authority
SAE System Architecture Evolution
STA Station
SW software
UE User Equipment
USB Universal Serial Bus V2I vehicle to infrastructure
V2N vehicle to network (typically same thing as a normal MBB connection)
V2P vehicle to pedestrian
V2V vehicle to vehicle
V2X Vehicle to anything, umbrella term for the below types of communication:

The invention claimed is:

1. A method for communication within a cooperative intelligent transport system, wherein said method comprises:
receiving, in a first node of said cooperative intelligent transport system, a first intelligent transport system message from another node of said cooperative intelligent transport system; and
identifying, in said first node, a technology status of said another node based on the first intelligent transport system message;
wherein the identification of said technology status comprises identifying information indicating said first intelligent transport system message was transmitted configured according to a predetermined first intelligent transport system technology;
wherein the identification of said technology status further comprises identifying a dual technology indicator of said first intelligent transport system message in a layer above the transport layer, said dual technology indicator being an information element identifying that the node transmitting the first intelligent transport system message is capable of communicating intelligent transport system messages according to said first intelligent transport system technology as well as according to a predetermined second intelligent transport system technology;
wherein said node is further configured to obtain a decision of congestion mitigation; and wherein said node is further configured to perform congestion mitigation methods according to said second intelligent transport system technology responsive to detecting that said technology status of a further node of said cooperative intelligent transport system shows that a further intelligent transport system message was transmitted configured according to said predetermined first intelligent transport system technology as well as that the further intelligent transport system message did not comprise any dual technology indicator, while maintaining transmissions configured according to said first intelligent transport system technology unaltered.

2. A node for communication within a cooperative intelligent transport system comprising:
a processor; and
memory, the memory comprising instructions executable by the processor whereby the processor is operative to,
receive a first intelligent transport system message from another node of said cooperative intelligent transport system, and
identify a technology status of said another node based on the first intelligent transport system message, wherein the identification of said technology status comprises identifying information indicating said first intelligent transport system message was transmitted configured according to a predetermined first intelligent transport system technology, and wherein the identification of said technology status further comprises-identifying a dual technology indicator of said first intelligent transport system message in a layer above the transport layer, said dual technology indicator being an information element identifying that the node transmitting the first intelligent transport system message is capable of communicating intelligent transport system messages according to said first intelligent transport system technology as well as according to a predetermined second intelligent transport system technology,
wherein said node is further configured to obtain a decision of congestion mitigation; and
wherein said node is further configured to perform congestion mitigation methods according to said first intelligent transport system technology responsive to detecting that said technology status of a further node of said cooperative intelligent transport system shows that a further intelligent transport system message was transmitted configured according to said predetermined first intelligent transport system technology as well as that the further intelligent transport system message did not comprise any dual technology indicator, while maintaining transmissions configured according to said second intelligent transport system technology unaltered.

3. The node according to claim 2, wherein said node comprises communication circuitry configured to receive said first intelligent transport system message from said another node of said cooperative intelligent transport system.

4. The node according to claim 2, wherein said node is further configured to transmit a second intelligent transport system message being available at least for said another node;
said transmitting comprises, if said technology status of said another node shows that said first intelligent transport system message was transmitted configured according to a predetermined first intelligent transport system technology as well as that said first intelligent transport system message did not comprise any dual technology indicator, transmitting said second intelligent transport system message configured according to said first intelligent transport system technology.

5. The node according to claim 4, wherein said node is further configured to further transmit said second intelligent transport system message configured according to said second intelligent transport system technology.

6. The node according to claim 2, wherein said node is further configured to incorporate a dual technology indicator in a layer above the transport layer in messages to be transmitted from said first node configured according said first intelligent transport system technology.

7. The node according to claim 2, wherein said node is further configured to refraining from transmitting intelligent transport system messages configured according to said first intelligent transport system technology responsive to detecting that a time since a last intelligent transport system message transmitted, using said first intelligent transport system technology, from any other node not comprising any dual technology indicator in its intelligent transport system message exceeds an invalidation time, said invalidation time being at least one order of magnitude larger than an expected longest time between intelligent transport system messages from said any other node not comprising any dual technology indicator in its intelligent transport system message.

8. The node according to claim 2, wherein said first intelligent transport system technology is a Dedicated Short-Range Communication technology.

9. The node according to claim 2, wherein said second intelligent transport system technology is a Long-Term Evolution Vehicle to Anything short range communication technology.

10. The node according to claim 2, wherein said first intelligent transport system technology is a Long-Term Evolution Vehicle to Anything short range communication technology.

11. The node according to claim 2, wherein said second intelligent transport system technology is a Dedicated Short-Range Communication technology.

12. The node according to claim 2, wherein at least one of said node and said another node is an on board unit.

13. The node according to claim 2, wherein at least one of said node and said another node is a road side unit.

14. The node according to claim 2, wherein said node is further configured to perform congestion mitigation methods according to said second intelligent transport system technology responsive to detecting that said technology status of a further node of said cooperative intelligent transport system shows that a second intelligent transport system message was transmitted configured according to said predetermined first intelligent transport system technology as well as that said second intelligent transport system message did not comprise any dual technology indicator, while maintaining transmissions configured according to said first intelligent transport system technology unaltered.

15. The node according to claim 14, wherein said congestion mitigation methods according to said second intelligent transport system technology comprises ceasing of transmissions configured according to said second intelligent transport system technology.

16. The node according to claim 14, wherein said congestion mitigation methods according to said first intelligent transport system technology comprises ceasing of transmissions configured according to said first intelligent transport system technology.

17. A method for communication within a cooperative intelligent transport system, wherein said method comprises:

receiving, in a first node of said cooperative intelligent transport system, a first intelligent transport system message from another node of said cooperative intelligent transport system; and identifying, in said first node, a technology status of said another node based on the first intelligent transport system message;

wherein the identification of said technology status comprises identifying information indicating said first intelligent transport system message was transmitted configured according to a predetermined first intelligent transport system technology;

wherein the identification of said technology status further comprises identifying a dual technology indicator of said first intelligent transport system message in a layer above the transport layer, said dual technology indicator being an information element identifying that the node transmitting the first intelligent transport system message is capable of communicating intelligent transport system messages according to said first intelligent transport system technology as well as according to a predetermined second intelligent transport system technology;

wherein said node is further configured to refrain from transmitting intelligent transport system messages configured according to said first intelligent transport system technology responsive to detecting that a time since a last intelligent transport system message transmitted, using said first intelligent transport system technology, from any other node not comprising any dual technology indicator in its intelligent transport system message exceeds an invalidation time, said invalidation time being at least one order of magnitude larger than an expected longest time between intelligent transport system messages from said any other node not comprising any dual technology indicator in its intelligent transport system message.

* * * * *